Dec. 3, 1968    M. ROBINSON ET AL    3,414,214
SATELLITE POSITIONING SYSTEM
Filed May 31, 1966    3 Sheets-Sheet 1
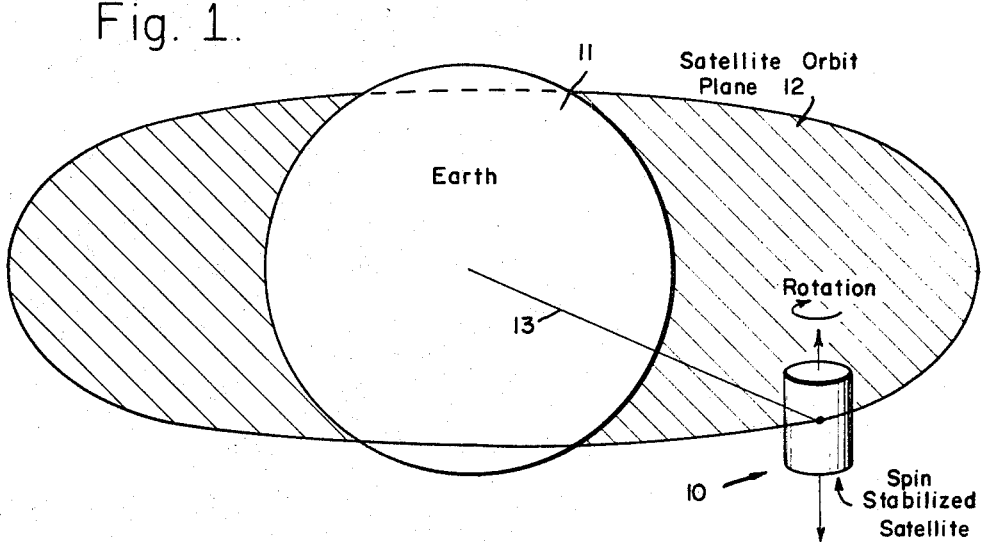
Fig. 1.
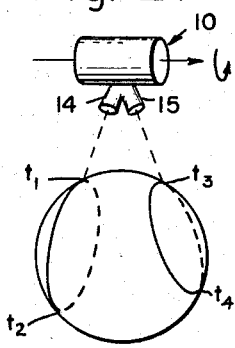
Fig. 2.
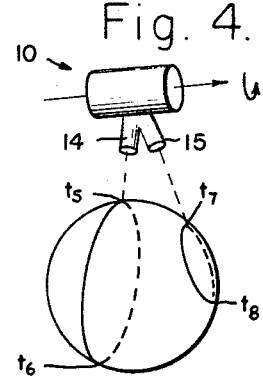
Fig. 4.
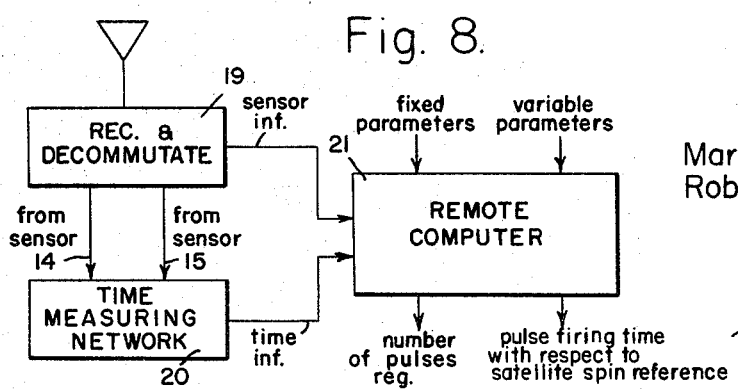
Fig. 8.
Martin Robinson,
Robert L. Barton,
INVENTORS.
BY
AGENT.

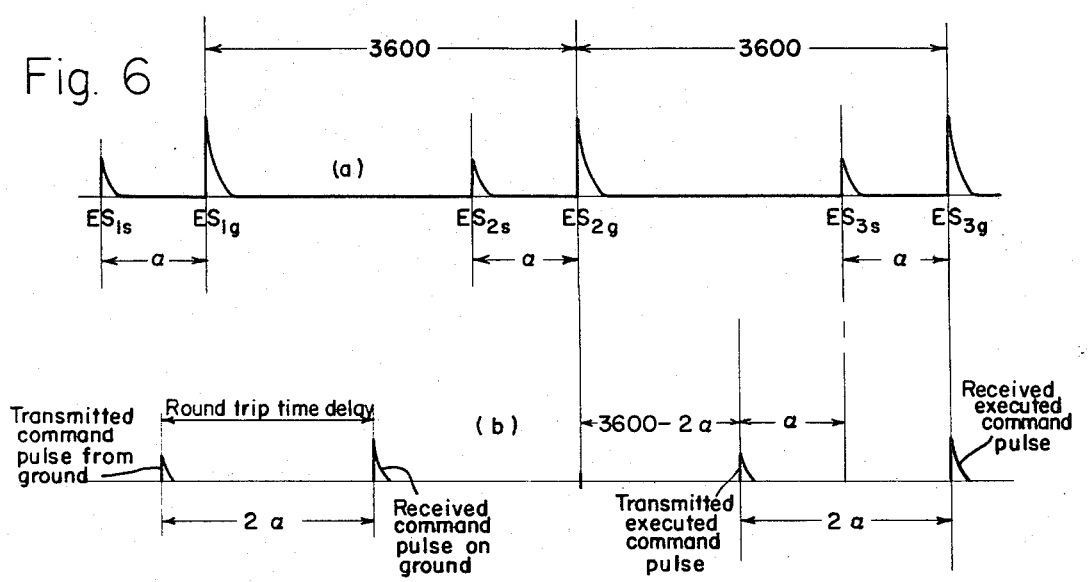
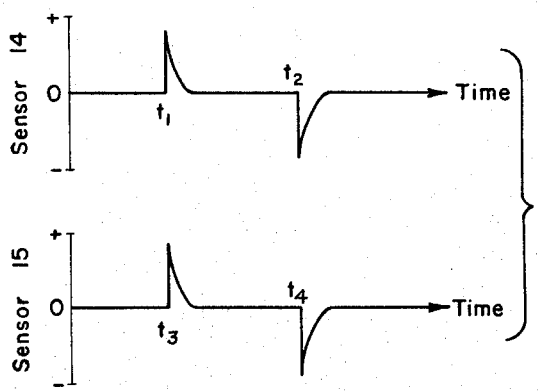
Fig. 3.
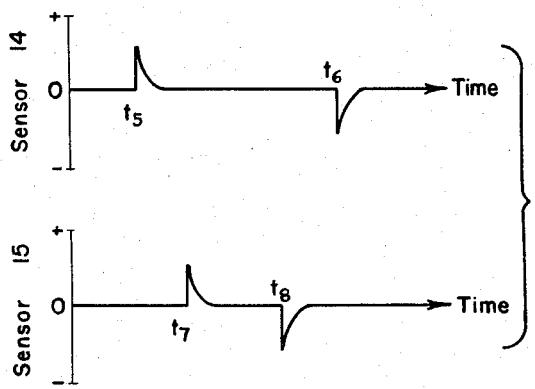
Fig. 5.
Martin Robinson,
Robert L. Barton,
INVENTORS.

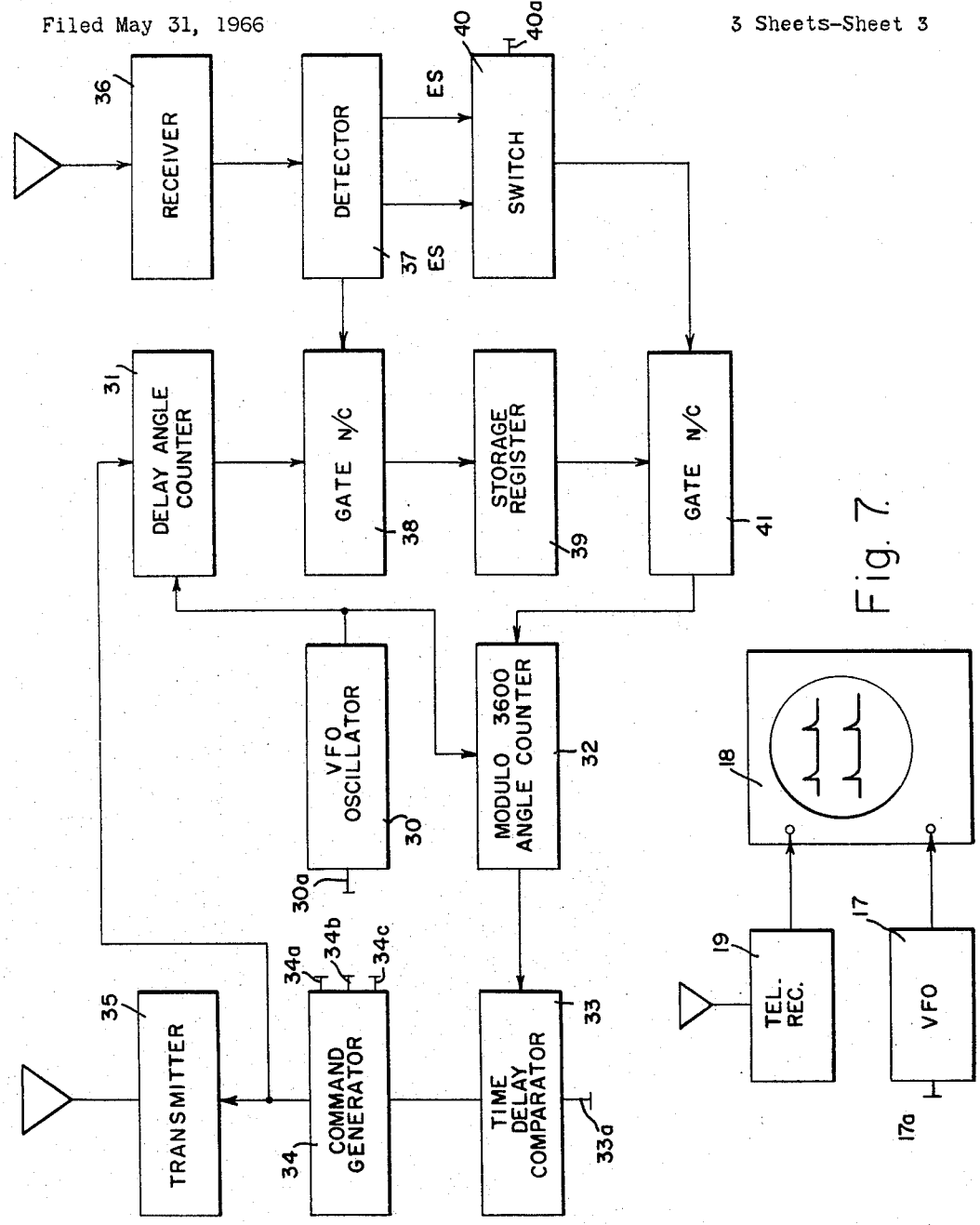

United States Patent Office 3,414,214
Patented Dec. 3, 1968

3,414,214
SATELLITE POSITIONING SYSTEM
Martin Robinson, Malibu, and Robert L. Barton, Canoga Park, Calif., assignors to TRW Inc., Redondo Beach, Calif., a corporation of Ohio
Filed May 31, 1966, Ser. No. 554,039
10 Claims. (Cl. 244—1)

ABSTRACT OF THE DISCLOSURE

A satellite stabilization technique using a two pulse attitude control is described. A pair of earth sensors located in a spin stabilized satellite each detect segments of the earth and transmit pulses to a ground station on earth which utilizes the pulses to determine the orientation of the satellite in a given orbit plane. Deviation of the satellite in the orbit plane is detected by the time difference between successive pairs of pulses of each of the earth sensors. Ground-controlled signals computed on the ground are transmitted to the satellite for firing repositioning mechanisms to reorient the satellite into the preferred position within the orbit plane as indicated by identical time sequence between successive pulses from each earth sensor. The system is particularly useful in a synchronous or 24-hour orbit satellite system in which the satellite appears to hover in a given location in the sky with respect to the earth.

---

This invention relates to a satellite positioning system and more particularly to a positioning system for use with a spin stabilized space vehicle.

The ability of the present state of the art to orient and stabilize the spin axis of a spin stabilized satellite is well known. A paper entitled, "Two Pulse Attitude Control of an Asymmetric Spinning Satellite," by P. C. Wheeler in the A.I.A.A. Guidance and Control Conference, published August 1963, by the Massachusetts Institute of Technology, describes a method of torquing a satellite to change the attitude of the spin axis of the satellite. The paper describes how torque pulses are applied to produce responses having periodic terms which are equal in amplitude but opposite in phase. The effect is that momentum increments are additive in inertial coordinates thus producing an angular reorientation of the spin axis without introducing residual periodic motion.

In the practice of the present invention, the prior art associated with expulsion of gases in the proper coordinates and at the proper time is utilized to control and reposition the spin axis of the satellite. The present invention is concerned with the over-all system including both satellite and ground control stations necessary to reposition an asymmetric spinning earth satellite which is nominally oriented with its spin axis normal to the plane of its orbit.

The satellite contains means such as a pair of earth sensors for detecting and generating signals of the earth horizon to thereby indicate a deviation of the spin axis of the satellite from a position normal to the orbit plane. These signals are telemetered to a signal receiving station on earth. The sensor data is transmitted to a computing station having all known conditions stored in its memory, is arranged and adapted to compute correction signals for transmission to the satellite. The round trip propagation time from the earth to satellite and return is determined in order to transmit the correction signals to the satellite at the proper time. Receiving means on the satellite receives the correction signals and controls suitable reaction generating means on the satellite for generating reaction forces in the proper direction and for the proper time to align the spin axis normal with respect to the orbit plane.

In the preferred embodiment the satellite is injected in an orbit about the earth in such a manner that the spin axis of the satellite is maintained perpendicular to the orbit plane of the satellite. This preferred position of the spin axis relative to the orbit plane is continually monitored by at least two earth sensors located on the satellite. In the preferred embodiment, two earth sensors are located at a fixed angle with respect to each other, which angle is determined by the preselected altitude of the satellite in the orbit plane. With the satellite in the preferred position, each earth sensor will intersect substantially equal length chords of the earth. Since the satellite is spin stabilized, each earth sensor will intersect the horizon of the earth two times for each revolution of the satellite. The chord of the earth intersected by each earth sensor will be indicated by a positive going pulse upon first intersecting the earth and a negative going pulse when leaving the earth at the second horizon. These pulses are telemetered to earth where the period of rotation of the spinning satellite is determined by the length of time between repetitive positive going pulses from either of the earth sensors. The position of the spin axis is established by measuring the time between positive going pulses telemetered from both earth sensors. In the preferred embodiment, redundancy is provided by using a sun sensor to measure the angle between the satellite and the sun, which information is telemetered to earth. Knowing the time of day and the position of the sun in the celestial heaven, the position of the spin axis of the satellite with respect to the orbital plane may be determined.

The earth sensors transmit the defined pulses in real time to the ground stations located on the earth. The time difference between received positive pulses from both earth sensors or the determination of the sun angle and the output from one earth sensor will provide sufficient information for a ground based computer to determine the firing time with respect to spin position and number of pulses needed to reposition the satellite. The ground based computer is supplied with all the known peripheral information concerning the satellite, such as altitude, mechanical configuration of the nozzles, pressure remaining in the storage tanks, and other data determined empirically to predict the movement and operation of the satellite. The output of the computer provides information indicating how many impulses any individual radial thrust valve requires and the exact time that each thrust valve must be turned on to correct the detected error condition. In the preferred embodiment, the mechanics of the spinning satellite is such that a system of pulses having a fixed duration length is used. The thrust valves in the satellite are repetitively impulses to obtain a given duration of thrust. The time of firing any given thrust valve is measured in relationship to the detection by the on-board earth sensor of the earth's horizon. Time of firing and the number of repetitive firings must therefore be determined in relationship to satellite time.

Further objects and advantages of the present invention will be made more apparent by referring now to the accompanying drawings wherein:

FIGURE 1 illustrates a spin stabilized satellite rotating about the earth;

FIGURE 2 illustrates a spin stabilized vehicle in the desired position of having the spin axis perpendicular to the orbit plane;

FIGURE 3 illustrates the timed relationship between the pulses generated by the earth sensor in the position illustrated in FIGURE 2;

FIGURE 4 illustrates a spin stabilized vehicle in a position that has deviated from the preferred and desired position illustrated in FIGURE 2;

FIGURE 5 illustrates the pulses generated by the earth sensors on the satellite illustrated in FIGURE 4;

FIGURE 6 is a series of diagrams illustrating the time relationship existing between the earth sensor pulses generated on the vehicle and telemetered to earth and the execute command pulses generated on earth;

FIGURE 7 is a block diagram illustrating how the spin rate is determined;

FIGURE 8 is a block diagram illustrating a remote computer used to determine the necessary correction pulses; and FIGURE 9 is a block diagram illustrating the system for transmitting command pulses as determined by the computer to the satellite.

Referring now to FIGURE 1, there is shown a spin stabilized satellite 10 in orbit about the earth 11. The satellite 10 is located in an orbital plane 12. In the desired and preferred position, the spin axis of the satellite is maintained perpendicular to the orbit plane and also perpendicular to the local gravity vector 13 passing from the center of the earth to the satellite. By definition, therefore, the gravity vector 13 is located in the orbit plane 12.

FIGURE 2 illustrates a spin axis of the rotating satellite 10 in the preferred position of being perpendicular to the orbit plane. Located on the satellite 10 are two earth sensors 14 and 15. The double earth sensors are the primary source of spin axis attitude information. The optical axis of the two earth sensors 14 and 15 are arranged in a V configuration with the plane of the V bisecting the angle formed by the earth sensors and intersecting the spin axis at right angles. With the spin axis in the desired position, the plane of the V should contain the local gravity vector. Since the satellite 10 is rotating, each earth sensor 14 and 15 sweeps across the earth once per satellite revolution, thereby producing a pulse whenever the view angle of each sensor crosses the earth's horizon. For the rotation of the satellite 10 as indicated in FIGURE 2, earth sensor 14 will intersect the horizon first at time $t_1$, then at time $t_2$. In a similar manner, earth sensor 15 will intersect the horizon first at time $t_3$ and then at time $t_4$. The time relationship of these pulses is indicated in connection with FIGURE 3 which shows each pulse a $t_1$ and $t_3$, generated by the earth sensors 14 and 15, respectively, as a positive going pulse, whereas each pulse at $t_2$ and $t_4$ are negative going pulses. These pulses are telemetered to a ground station having a capability of measuring the time differences between the leading edge of the positive going pulses from each of the earth sensors. The time difference between the positive pulses and the detection of which earth sensor sees the earth first supplies the necessary information concerning the position of the spin axis of the rotating satellite 10 with respect to the orbit plane 12. The coincidence of pulses $t_1$ and $t_3$ indicates the spin axis of the satellite 10, as shown in FIGURE 2, is in the preferred position.

The diagram illustrated in FIGURE 4 shows the rotating satellite 10 with the spin axis incline to the orbit plane, thereby causing the earth sensors 14 and 15 to view unequal and different portions of the earth. Earth sensor 14, for example, will intersect the horizon closer to the equator at time $t_5$ and again at time $t_6$. Earth sensor 15, on the other hand, views a smaller chord of the earth than earth sensor 14 and hence will intersect the earth at time $t_7$ and again at time $t_8$. The time relationship between the pulses generated by the earth sensors is shown in connection with FIGURE 5 which graphically illustrates the time difference between $t_5$ and $t_7$. Under normal conditions, the spin axis attitude with respect to the local vertical is determined accurately and rapidly on the ground by measuring the timed interval between the leading edge of the positive pulses generated by each of the earth sensors. When a time interval is detected and measured, the spin axis displacement is computed and the time and duration of correction pulses needed to correct this condition are also computed for transmission to the satellite. Attitude errors are determined, therefore, from the onboard earth sensors and are corrected by ground control signals. Satellite attitude corrections are made by pulsing an axial thrust valve upon receipt of a ground command that is properly timed with respect to the telemetered earth sensor pulses. The command signal is transmitted from the ground station in satellite time, not earth time. In other words, the command signal must arrive at the satellite at a time based on when the earth sensor sees the horizon. The next important problem to be discussed is the system for measuring the time delay for a command signal transmitted from the ground to reach the satellite at a variably selected time based or measured from the time a selected earth sensor sees the horizon.

Referring now to FIGURE 6, there is illustrated a series of timed pulses used to explain the operation of the time measuring system. In FIGURE 6a, there is shown a plurality of earth sensor pulses generated by either earth sensor 14 or 15 as illustrated in FIGURE 2. For the purpose of this discussion, only the positive going pulses generated by earth sensor 14 are considered. The positive going pulses generated in the satellite by earth sensor 14 are identified as the earth sensor satellite ($ES_s$) pulses. These pulses are identified in FIGURE 6a as $ES_{1s}$, $ES_{2s}$, etc. There is, of course, a time delay between the generation and transmission of the pulses on the satellite and the time these same pulses are received and detected on the ground as an earth sensor ground ($ES_g$) pulse. The one-way time delay representing the time difference between the generated pulse ($ES_{1s}$) on the satellite and the received pulse ($ES_{1g}$) on the ground is identified as $\alpha$. In a similar manner, pulses $ES_{2g}$ and $ES_{3g}$ are received on the ground at a time $\alpha$ after the generation of the $ES_{2s}$ and $ES_{3s}$ pulses on the satellite. The time on the ground between the received pulses of $ES_{1g}$ and $ES_{2g}$, for example, represents the period of rotation of the satelite. A variable frequency oscillator located on the ground is arranged to generate a multiple frequency substantially equal to one over the period of the rotating satellite as measured by the time between successively received pulses. In the preferred embodiment the period of the satellite is divided into 360 parts and a substantially high frequency oscillator is chosen of the order of one mc. in order to generate 10 cycles or 10 counts for each one degree of revolution of the rotating satellite. The variable frequency oscillator may be continuously synchronized with the received pulses on the ground or manually synchronized at discrete times. In the preferred embodiment, as shown in FIGURE 7, the output of a variable frequency oscillator (VFO) 17 is fed to one trace of a dual trace oscilliscope 18, whereas the detected earth sensor pulses received from the satellite in a receiver 19 are fed to the second trace of the dual trace oscilliscope. The operator may vary the fine frequency adjustment 17a of the variable frequency oscillator until the pulses displayed on the oscilliscope 18 coincide thereby insuring the synchronization of the variable frequency oscillator with the rotational frequency of the satellite.

Referring to FIGURE 8, there is shown a simplified block diagram showing how a ground based computer may be used to determine the nozzle firing duration and firing time. The receiver 19 receives and detects the $ES_g$ pulses from both sensors 14 and 15 shown in FIGURES 2 and 3. The received positive going pulses are both fed to a time measuring network 20 arranged to measure the time interval between the $ES_g$ pulses received from the sensors 14 and 15. The measured time is fed to a digital computer 21 which also receives sense information, of which $ES_g$ pulse arrived first from receiver 19. The computer 21 continually receives variably parameter information such as the spin rate frequency from the VFO 17 shown in FIGURE 7. Fixed parameter information such as weight of the satellite, gas pressure, nozzle size, and reaction coefficients are stored and updated when necessary. In a properly programmed digital computer it is possible for the computer 21 to assimilate the information and determine when to fire the reaction nozzles and the time duration of firing to reposition the satellite in the deferred orbit plane.

The problem still to be solved is the determination of the $\alpha$ time delay as illustrated in FIGURE 6. This information is needed to insure the correction signal transmitted from the ground to the satellite will arrive at the satellite at the proper selected time relative to the rotation of the satellite about its spin axis. Another way of expressing this is to state that the correction signal must arrive in satellite time. For convenience the reference point on the rotating satellite is the instant the earth sensor sees the first horizon on the earth, which is identified as the $ES_s$ pulses illustrated in FIGURE 6a. The command signal transmitted from the ground must therefore arrive at the satellite at a time that is fixed relative to $ES_s$. Since the physical locations of the nozzles are known relative to this position, the correction commands selected by the computer are all made relative to this same reference point on the rotating satellite. The time delay is determined by transmitting a command pulse to the satellite at any arbitrary time as shown in FIGURE 6b. This pulse resets the counter 31 to zero. The satellite receives the command pulse and immediately retransmits the pulse back to the ground station with essentially zero time delay within the satellite. The ground receiver detects the received trigger pulse and this pulse opens the gate 38 which dumps the count into the storage register 39, thereby storing the time between the transmitted trigger pulse and the received pulse which is the roundtrip time delay. The time between subsequent received ground pulses ($ES_g$) is made equivalent to 3600 counts, as shown by the time distance between $ES_{2g}$ and $ES_{3g}$ in FIGURE 6a. Since the roundtrip time delay of $2\alpha$ has been determined, as shown in FIGURE 6b, it is now possible to generate an execute command signal from the ground at a time of 3600 minus $2\alpha$ measured from the last received ground pulse of $ES_g$. This will insure the transmission on the ground of the execute command pulse that will arrive on the satellite at the same time the earth sensor sees the horizon of the earth. In the preferred embodiment, the execute command pulse not only executes the desired command on the satellite, but is also retransmitted back to the ground station and received as indicated in FIGURE 6b as the received executed command pulse. As the graph indicates, the received executed command pulse will coincide on the ground with the reception of the subsequent $ES_g$ pulse which thereby indicates the proper $2\alpha$ time delay between the transmitted execute command pulse and the received execute command pulse. In this manner, the roundtrip time delay is continually updated and insures that the transmitted execute command pulse will arrive on the satellite at the time the earth sensor crosses the first horizon to generate an earth sensor pulse $ES_g$.

The block diagram shown in FIGURE 9 is a preferred implementation of the scheme described in connection with FIGURE 7. There is shown a substantially stable variable frequency oscillator 30 having the capability of being either manually controlled or electronically controlled. In the preferred embodiment the VFO 17 shown in FIGURE 7 would be one and the same, and as mentioned previously the VFO 30 is manually controlled and synchronized with the rotational frequency of the rotating satellite. The spin frequency of the satellite will vary from approximately 120 to 180 revolutions per minute, which is equivalent to a frequency variation of from two cycles per second to three cycles per second. Improved timing accuracy is achieved by using a substantially high frequency of one mc. and then dividing the period into 3600 counts, thereby generating 10 counts per one degree of satellite rotation. The output of the VFO 30 is fed to a delay angle counter 31 and a modulo 3600 angle counter 32. Both the delay angle counter 31 and the modulo 3600 angle counter 32 receive the output of the VFO 30 which is synchronized to the rotational speed of the satellite. Both counters 31 and 32 have the capability of continually counting to 3600 and resetting to zero unless controlled by external command signals. The rate at which both counters will accumulate information will be 10 counts for each degree of rotation of the satellite as determined by the VFO 30. The counter 32 is arranged to generate an output pulse whenever the accumulated count is reset from 3600 to zero which pulse is fed to a time delay comparator 33. Under normal conditions the output of the computer 21 in FIGURE 8 will indicate the amount of time delay to be manually inserted into the time delay comparator. By assuming an initial condition in which the roundtrip delay time to be determined, we can assume there is no arbitrary fixed delay to be inserted in the time delay comparator 33. Normally the time delay comparator 33 is set by control 33a to include a preset time delay as determined by the computer. The reset pulse from the angle counter 32 is fed through the time delay comparator 33 to a command generator 34 arranged to select the desired command signal to be transmitted to the satellite. In the over-all system there are many command signals that may be transmitted to the satellite, and these may include an antenna selecting switch, a battery switch, a solar cell switch, just to mention a few. The actual command transmitted is a function of the modulation impressed on the transmitted carrier. For example, the command generator 34 contains a plurality of preset tone generators individually set by controls 34a, 34b and 34c. The actual command transmitted to the satellite is therefore a function of the control 34a, 34b or 34c which codes the transmission according to preset modulation tones.

The roundtrip delay is measured and updated whenever a command signal is transmitted to the satellite. This insures that executing a command pulse also updates the previously measured roundtrip delay time between the ground station and the satellite. The command generator 34 is manually preset but does not generate an output until a pulse is received from the time delay comparator 33. When impulsed, the command generator 34 controls the transmission from the ground station via a transmitter 35. The execute trigger pulse feeding the transmitter 35 is also fed to the delay angle counter 31 as a reset to zero and start pulse. In point of time the delay angle counter 31 is reset to zero and begins counting at the rate of 10 pulses for each degree of revolution of the satellite at the same time that the transmitter 35 is impulsed to transmit a command pulse to the satellite. The satellite receives the command signal and acts upon the command as a result of the coded modulation information contained in the command signal. In addition, the command signal received by the satellite is immediately retransmitted back to the ground station where it is received by a receiver 36. The output of the receiver 36 feeds a detector 37 which detects the received command pulse and feeds this pulse to a normally closed gate 38. The gate 38 upon receipt of the received command pulse is opened, thereby allowing the accumulated count from the delay angle counter 31 to be dumped and stored into a storage register 39. The detector 37 also receives and detects the earth sensor pulses generated in the satellite and transmitted to the ground station. In the preferred embodiment receiver 36, FIGURE 9, and receiver 19, FIGURES 7 and 8, are incorporated into a single instrument. The individual earth sensor pulses detected by the detector 37 are each fed to a switch 40, which is arranged to arbitrarily select either pulse by control 40a. The purpose of switch 40 is simply to provide the capability of selecting either of the earth sensors.

The output of one earth sensor is used and selected by means of the switch 40 and fed to a normally closed gate 41. The count accumulated by the storage register 39 is prevented from passing through the gate 41 until the earth sensor pulse from switch 40 opens the gate 41, thereby allowing the stored count from the storage register 39 to be fed directly into the angle counter 32. The effect of opening gate 41 is to advance the count in the modulo angle counter 32 by the amount contained in the storage element 39.

As mentioned previously the reason for determining the roundtrip delay time is due to the requirement that a transmitted execute command pulse arrive at the satellite when an earth sensor pulse ($ES_s$) is generated in the satellite. The time between received earth sensor pulses ($ES_g$) is equivalent to one revolution of the satellite, see FIGURE 6, which is also equal to 3600 counts from VFO 30. The modulo angle counter 32 contains a count equivalent to the roundtrip time of $2\alpha$ between the earth, the satellite, and back to the earth, as shown in FIGURE 6. The next execute command signal will not be generated until the modulo angle counter 32 has continued its count to 3600 and is reset. Depending upon the needs of the system, the next execute command pulse may be sent at any time. If we assume that the command generator 34 is programmed to transmit an execute command pulse we must wait until the modulo angle counter 32 is reset from 3600 to zero at which time a pulse is generated and fed through the time delay comparator 33 to the command generator 34 which impulse the transmitter 35. At the same time, the delay angle counter 31 is reset to zero and continues counting. As shown in FIGURE 6b, the transmitted command pulse is now transmitted at a time after the last received earth sensor pulse on the ground which is equivalent to 3600 minus $2\alpha$. Just to repeat, the received execute command pulse from detector 37 opens the gate 38 which dumps the accumulated count from the delay angle counter 31 into the storage register 39. The received earth sensor pulse is detected by detector 37 and fed through the switch 40 which opens gate 41 allowing the accumulated count in the storage register 39 to be fed into the mudulo angle counter 32.

FIGURE 6 shows that by transmitting the execute command pulse at a time ($3600-2\alpha$) after receiving an $ES_g$ pulse the command signal will arrive at the satellite at the same time that the earth sensor pulse is generated in the satellite. In this manner, all command signals will always arrive at the same time that an earth sensor in the satellite sees the horizon of the earth. Depending on the correction required as determined by the computer, the time delay comparator 33 is adjusted to cause a nozzle firing time relative to the same position in the rotating satellite. A given duration is accomplished by repetitively firing the same nozzle by additional commands until the time as determined by the computer is satisfied.

The embodiments of the invention in which an exclusive property or privilege is claimed are defined as follows:

1. In combination:
   a spin stabilized satellite adapted to orbit the earth in a given orbit plane,
   means on said satellite for generating signals indicative to a deviation of said satellite from said orbit plane,
   means for telemetering said signals to a signal receiving station on earth,
   a processing station arranged and adapted to receive said telemetered signals from said receiving station and generate correction signals for transmission to said satellite,
   means on earth for determining the roundtrip propagation time to thereby transmit said correction signals at the proper time and duration to said satellite,
   and means on said satellite for receiving said correction signals and releasing energy in response thereto whereby reaction forces sufficient to remove the deviation of said satellite from said orbit plane are generated.

2. In combination:
   a rotating satellite having a spin axis and adapted to orbit the earth in a given orbit plane,
   detecting means on said satellite for generating signals of the earth horizon to thereby indicate a deviation of the spin axis of said satellite from a position normal to the orbit plane,
   means for telemetering said signals to a signal receiving station on earth,
   a computing station arranged to receive the telemetered signals from said receiving station and generate correction signals for transmission to said satellite,
   means on earth for determining the roundtrip propagation time to thereby transmit said correction signals to said satellite,
   means on said satellite for receiving said correction signals,
   and reaction means on said satellite for generating reaction forces in the proper direction and for the proper time to align the spin axis normal with respect to the orbit plane.

3. A combination according to claim 2 in which said detecting means comprises at least one horizon sensor fixedly positioned on the satellite and adapted to generate a signal when intersecting the horizon of the earth.

4. A combination according to claim 2 in which said receiving station includes frequency counting means for measuring the time between received signals as a measure of the spin rate of the satellite about the spin axis.

5. A combination according to claim 2 in which said detecting means comprises a pair of horizon sensors arranged in a V and directed at the earth, each of said sensors generating a signal when viewing the horizon of the earth.

6. A combination according to claim 5 which includes means on the earth for measuring the time interval between received pulses from said pair of earth sensors as a measure of the deviation of the said axis from the orbit plane.

7. A system for insuring that a signal transmitted from earth is received by a rotating satellite at a time measured with respect to the satellite spin reference comprising:
   means on a rotating satellite for detecting and transmitting a reference pulse to earth,
   means on earth for receiving and detecting said transmitted reference pulse,
   means for synchronizing a variable frequency oscillator (VFO) with said received detected reference pulse whereby the frequency of said VFO is indicative of the spin rate of the rotating satellite,
   means for transmitting a tagged pulse from earth and measuring the roundtrip time from earth to satellite back to earth in terms of the spin rate of the rotating satellite,
   and means responsive to receiving the tagged pulse and said reference pulse on earth at the same time for controlling the time of transmission of said tagged pulse whereby said tagged pulse will arrive at the satellite at the time the satellite detects the reference pulse.

8. A system according to claim 7 which includes delay means for selectively delaying the transmission of the tagged pulse whereby said pulse is caused to arrive at the satellite at a selected time with respect to said reference pulse detected by the satellite.

9. A method for insuring that a signal transmitted from earth is received by a rotating satellite at a time measured with respect to the satellite spin reference comprising the steps of:
   first detecting and transmitting a reference pulse from a satellite to earth,
   then receiving and detecting said transmitted reference pulse on earth,
   then synchronizing a variable frequency oscillator (VFO) with said received detected reference pulse whereby the frequency of said VFO is indicative of the spin rate of the rotating satellite, then transmitting a tagged pulse from earth and measuring the roundtrip time from earth to satellite back to earth in terms of the spin rate of the rotating satellite.

and then controlling the time of transmission of said tagged pulse in response to receiving the tagged pulse and said reference pulse on earth at the same time whereby said tagged pulse will arrive at the satellite at the time the satellite detects the reference pulse.

10. A method according to claim 9 in which the tagged pulse is selectively delayed to cause the pulse to arrive at the satellite at a selected time with respect to said reference pulse detected by the satellite.

References Cited
UNITED STATES PATENTS

| | | | |
|---|---|---|---|
| 3,141,635 | 7/1964 | Davis, et al. | 244—3.14 |
| 3,180,587 | 4/1965 | Garner, et al. | 244—1 |

FERGUS S. MIDDLETON, *Primary Examiner.*